(12) United States Patent
Lee et al.

(10) Patent No.: US 7,925,317 B2
(45) Date of Patent: Apr. 12, 2011

(54) KEYPAD, SLIDING MODULE AND SLIDING MODULE FLEXIBLE CIRCUIT FOR PORTABLE TERMINAL

(75) Inventors: Yang-Jic Lee, Gwacheon-si (KR); Myoung-Hoon Park, Goyang-si (KR); Byung-Chan Lee, Seongnam-si (KR); Soo-Ik Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 11/540,585

(22) Filed: Oct. 2, 2006

(65) Prior Publication Data

US 2007/0080950 A1    Apr. 12, 2007

(30) Foreign Application Priority Data

Oct. 11, 2005   (KR) .................. 10-2005-0095536
May 3, 2006    (KR) .................. 10-2006-0039934
Jul. 12, 2006   (KR) .................. 10-2006-0065378

(51) Int. Cl.
*H04W 1/00*      (2006.01)
*G09G 5/00*      (2006.01)

(52) U.S. Cl. ..................... 455/575.4; 345/169
(58) Field of Classification Search .............. 455/575.4
See application file for complete search history.

(56) References Cited

U.S. PATENT DOCUMENTS

| | | | | |
|---|---|---|---|---|
| D531,607 S | * | 11/2006 | Kim et al. | D14/138 AD |
| D548,213 S | * | 8/2007 | Lee et al. | D14/138 AC |
| D550,192 S | * | 9/2007 | Kim et al. | D14/138 AD |
| D565,532 S | * | 4/2008 | Arnold | D14/138 AD |
| 2002/0050399 A1 | | 5/2002 | Yang et al. | |
| 2005/0009581 A1 | * | 1/2005 | Im et al. | 455/575.4 |
| 2005/0059438 A1 | * | 3/2005 | Jellicoe | 455/575.1 |
| 2005/0091431 A1 | | 4/2005 | Olodort et al. | |
| 2005/0104856 A1 | | 5/2005 | Jacobs et al. | |
| 2005/0107137 A1 | * | 5/2005 | Byun et al. | 455/575.1 |
| 2005/0107142 A1 | | 5/2005 | Soejima | |
| 2005/0245251 A1 | | 11/2005 | Lee et al. | |
| 2006/0046796 A1 | | 3/2006 | Park et al. | |
| 2006/0114646 A1 | | 6/2006 | Koibuchi et al. | |

FOREIGN PATENT DOCUMENTS

| | | |
|---|---|---|
| CN | 1741721 A | 3/2006 |
| CN | 1761269 A | 4/2006 |
| EP | 1 530 345 A1 | 5/2005 |
| EP | 1 631 043 A1 | 3/2006 |
| EP | 1 775 917 A1 | 4/2007 |
| KR | 2005-0105895 | 11/2005 |
| KR | 20-0421654 | 3/2006 |
| KR | 2006-0011654 | 3/2006 |
| KR | 10-2006-0032296 | 4/2006 |
| KR | 2006-0045514 | 5/2006 |
| KR | 20-0421654 | 7/2006 |
| KR | 10-2006-0129908 | 12/2006 |
| WO | WO 2006/072657 | 7/2006 |
| WO | WO 2007/024395 | 3/2007 |

* cited by examiner

*Primary Examiner* — Nick Corsaro
*Assistant Examiner* — Joseph Dean, Jr.
(74) *Attorney, Agent, or Firm* — Roylance, Abrams, Berdo & Goodman, L.L.P.

(57) ABSTRACT

A keypad for a portable terminal is disclosed. The portable terminal includes a first housing and a second housing coupled with the first housing so as to be able to slide in a first direction or in a second direction substantially perpendicular to the first direction. The keypad includes a first keypad on the first housing which is exposed or covered as the second housing slides in the first direction, and a second keypad on the first housing which is exposed or covered as the second housing slides in the second direction.

26 Claims, 19 Drawing Sheets

KEYPAD, SLIDING MODULE AND SLIDING MODULE FLEXIBLE CIRCUIT FOR PORTABLE TERMINAL

CROSS-REFERENCE TO RELATED APPLICATIONS

This application claims the benefit under 35 U.S.C. § 119(a) of applications filed in the Korean Industrial Property Office on Oct. 11, 2005, May 3, 2006 and Jul. 12, 2006, and assigned Serial Nos. 2005-0095536, 2006-0039934 and 2006-0065378, respectively. The entire contents of each of these applications are hereby incorporated by reference.

BACKGROUND OF THE INVENTION

1. Field of the Invention

The present invention relates to portable terminals. More particularly, the present invention relates to a keypad, a sliding module and a flexible circuit which can reduce the overlapping space between two housings of a portable terminal, thereby ensuring more usable space for input/output devices of the portable terminal.

2. Description of the Related Art

In general, a "portable terminal" is an appliance for providing wireless communication between users, or between a user and a service provider via, for instance, a mobile communication base station. A portable terminal provides a user with various services, for example, voice communication services, short message service (SMS), mobile banking, television viewing, on-line games, and video on demand (VOD).

Portable terminals may be classified into bar-type terminals, flip-type terminals, and folder-type terminals according to their appearance. A bar-type terminal has input/output devices such as a communication circuit, sender, receiver, etc. mounted in a single housing. A flip-type terminal has a flip cover mounted to a bar-type terminal. A folder-type terminal has a pair of housings exposed or covered by relative pivoting, in which input/output devices are placed on one of the housings. Other types of terminals, such as swing-type terminals, have also appeared on the market. Swing-type terminals and folder-type terminals help satisfy the various tastes of users while having increased portability and convenience of use.

In the early stages of mobile communication, mobile communication services were limited to voice communication and short message transmission. As mobile communication has developed, services has gradually expanded to include transmission of games, music and moving picture files, on-line services, multimedia services, and so on.

The increased diversification of mobile communication services has led to an increased diversification of the functions performed by a portable terminal together. The increased diversification of services has also increased the diversification of the design (that is, appearance) of the portable terminal as input/output devices capable of sufficiently utilizing the diversified functions are added to the portable terminal.

Due to design restrictions on portable terminals, there are limitations in mounting the various input/output devices within the limited space of the portable terminal. There are also limitations with respect to including additional input/output devices to accommodate additional functions.

Further, the conventional portable terminal is constructed so that when two housings are opposite to each other, one housing slides on the other housing in one direction, and is exposed up to about half of the length of the other housing. For this reason, the entire area of the portable terminal cannot be used, which imposes restrictions on the installation of keys, liquid crystal displays (LCD), and the like.

Accordingly, there is a need for a portable terminal with an improved input/output device configuration.

SUMMARY OF THE INVENTION

An object of the present invention is to address at least the above problems and/or disadvantages and to provide at least the advantages described below. Accordingly, an object of the present invention is to provide a portable terminal having an expanded input device.

It is another objective of the present invention to provide a sliding module for a portable terminal, in which one housing of the portable terminal is constructed to slide in two directions, thereby providing more usable space on the portable terminal, resulting in more keys and a larger display, and improving the convenience of use of the portable terminal.

It is yet another objective of the present invention to provide a sliding module for a portable terminal, in which when one housing of the portable terminal slides in two directions, and a flexible circuit is constructed to independently move in each direction, thereby preventing the flexible circuit of the portable terminal from being damaged.

It is yet another objective of the present invention to provide a keypad for a portable terminal, in which at least one navigation key is exposed or covered as a housing of the terminal slides in a second direction, thereby using the navigation keys not only as a key input device of the terminal but also as a game key and a key for another mode.

In order to accomplish these objectives, according to an aspect of the present invention, a keypad for a portable terminal that includes a first housing and a second housing coupled with the first housing so as to be able to slide in a first direction and in a second direction substantially perpendicular to the first direction is provided. The keypad includes a first keypad on the first housing that is exposed or covered as the second housing slides in the first direction, and a second keypad on the first housing that is exposed or covered as the second housing slides in the second direction.

According to another aspect of the present invention, a sliding module for a portable terminal that includes a first housing provided with first and second keypads, and a second housing coupled with the first housing so as to be able to slide in a first direction and in a second direction substantially perpendicular to the first direction is provided. The sliding module includes a first member fastened to the first housing, a second member fastened to the second housing, and a dual sliding guide provided between the first and second members for guiding the second housing so as to be able to slide in the first or second direction.

According to yet another aspect of the present invention, a sliding module flexible circuit for a portable terminal that includes a first housing provided with first and second keypads, and a second housing coupled with the first housing so as to be able to slide in a first direction and in a second direction substantially perpendicular to the first direction is provided. The sliding module flexible circuit includes a base member fastened to the first housing, a sliding module having first and second sliding members that are stacked on the base member and slide the second housing along the first housing in the first or second direction, and a sliding flexible circuit provided in the portable terminal and bent as the second housing slides in the first or second direction so as to increase or decrease in dimension in each direction.

According to yet another aspect of the present invention, a key pad for a portable terminal that includes a first housing, and a second housing coupled with the first housing so as to be able to slide in a first direction and in a second direction substantially perpendicular to the first direction is provided. The key pad includes a first key pad on the first housing that is exposed or covered as the second housing slides in the first direction, a second key pad on the first housing that is exposed or covered as the second housing slides in the second direction, and at least one navigation key provided on the first and second key pads that is exposed or covered as the second housing slides in the first and second directions.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
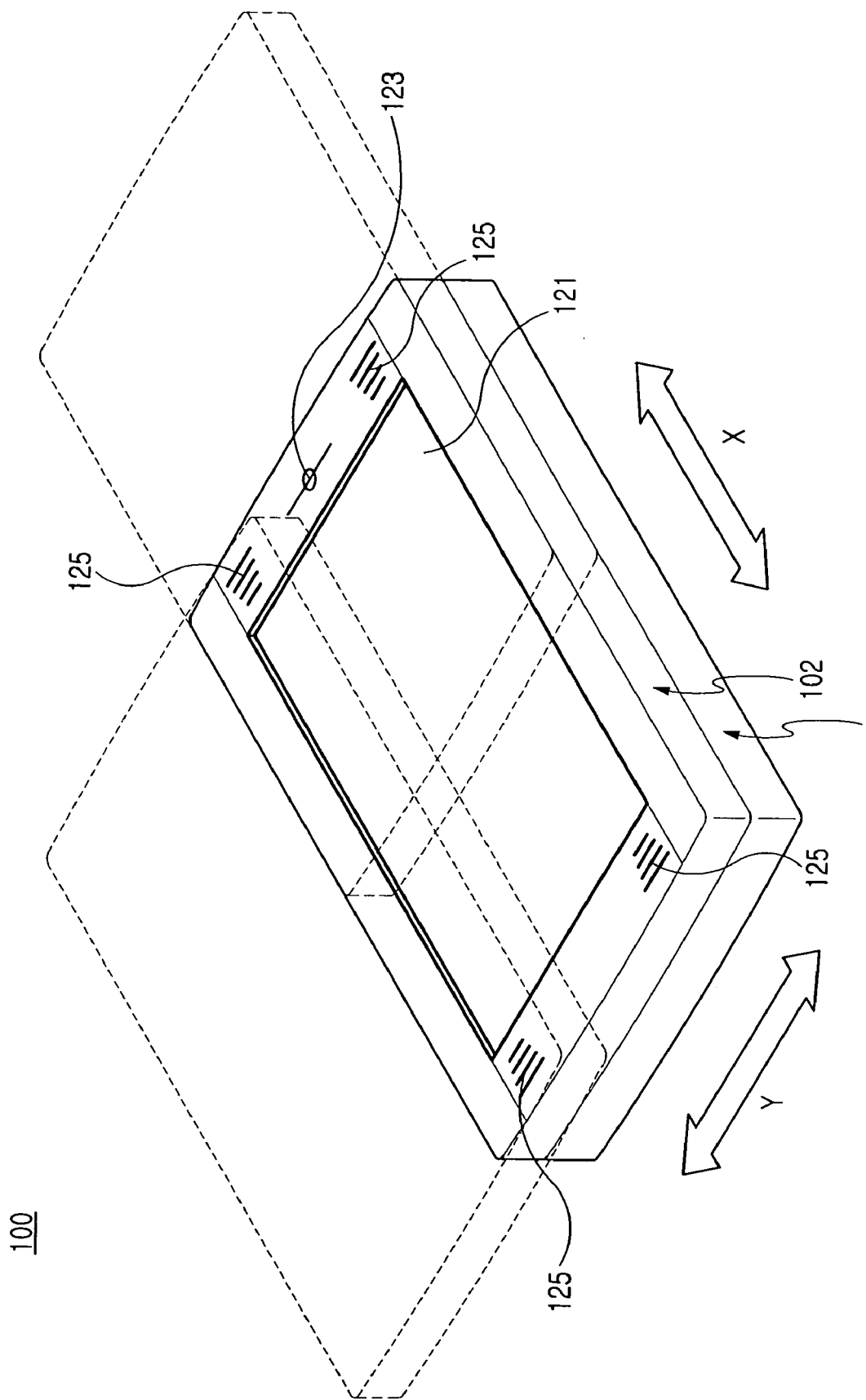
FIG. 1 is a perspective view of a portable terminal with a keypad in accordance with an exemplary embodiment of the present invention.

FIG. 1 is a perspective view of a portable terminal 100 with a keypad in accordance with a first exemplary embodiment of the present invention. As illustrated in FIG. 1, the portable terminal 100 is comprised of a first housing 101 and a second housing 102 that is slidably coupled with the first housing 101. The second housing 102 slides on the first housing 101 in a first direction X, or in a second direction Y perpendicular to the first direction X.

The second housing 102 is provided with a display 121, a receiver 123 having a built-in speaker phone, at least one speaker 125, and the like. The receiver 123 is installed on an upper end of the second housing 102 so as to secure a sufficient distance from a sender 115 (see FIG. 2). There is typically at least one pair of speakers 125 which are installed along the edges of the display 121. In the present exemplary embodiment, there are two pairs of speakers 125 installed on the upper and lower edges of the display 121. Thus, when broadcast programs and the like are viewed through the portable terminal 100, the speakers 125 may generate stereophonic sounds, three-dimensional stereophony, etc.

Figure 2:
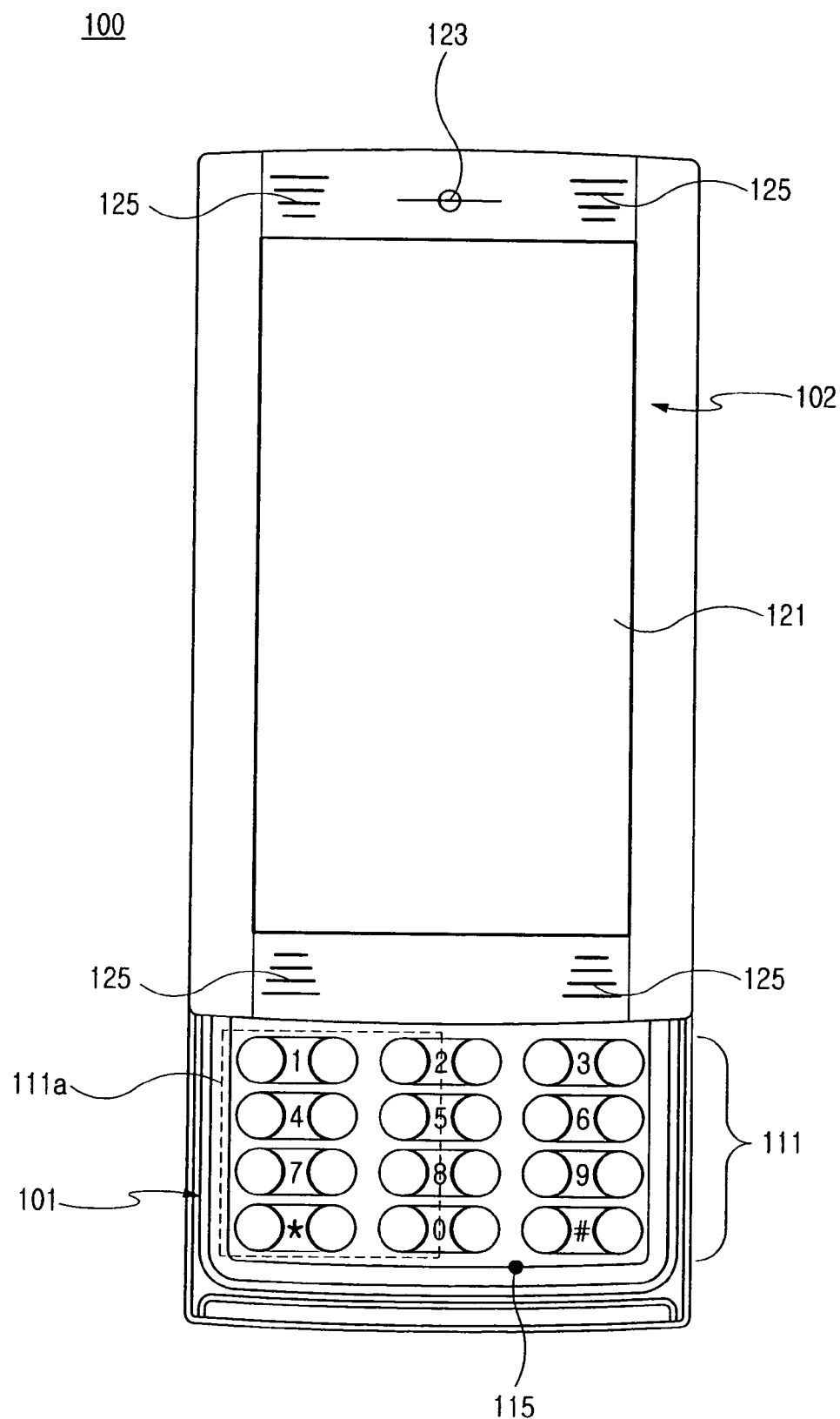
FIG. 2 is a top plan view of a first keypad of the portable terminal of FIG. 1.
Figure 3:
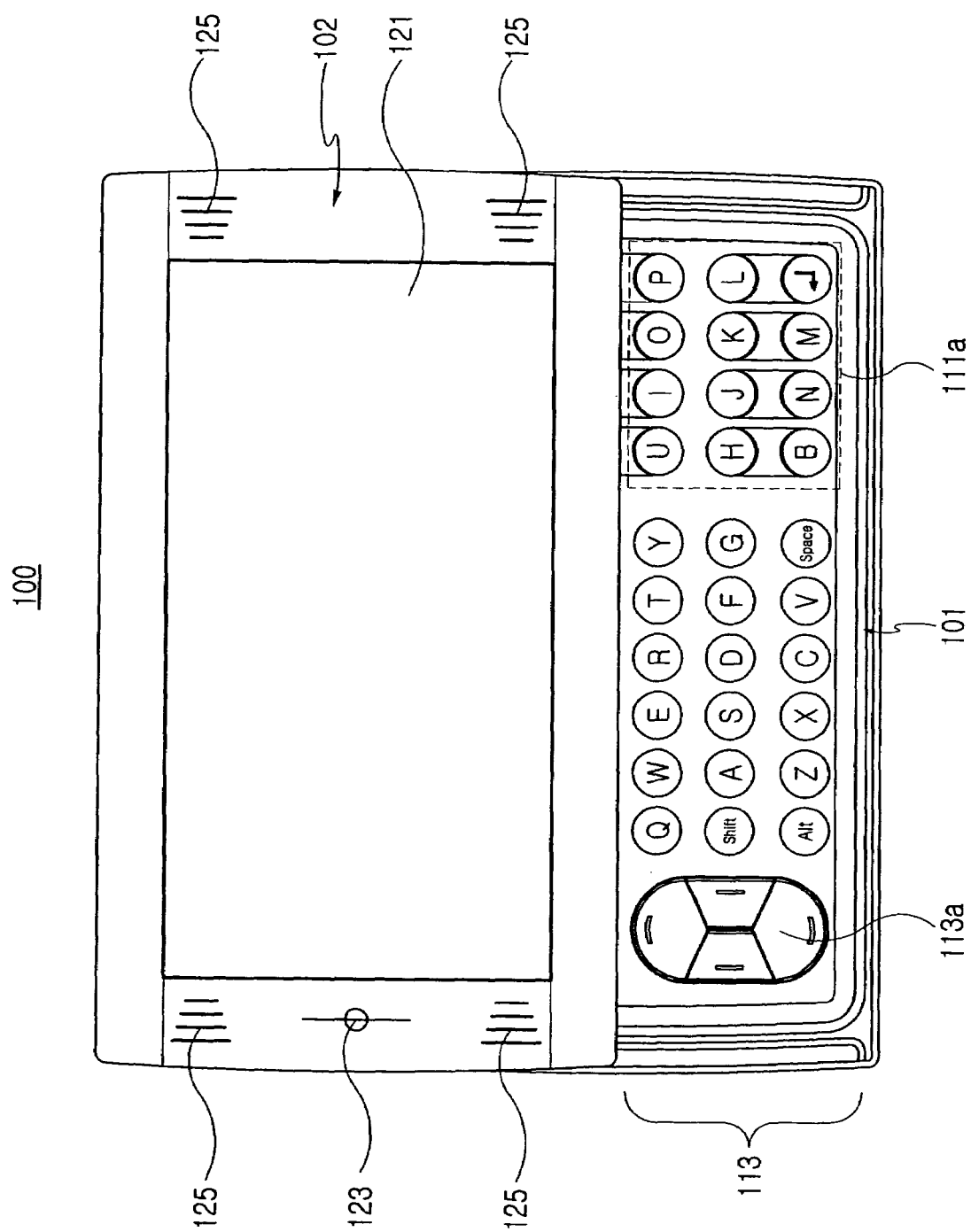
FIG. 3 is a top plan view of a second keypad of the portable terminal of FIG. 1.

Further referring to FIGS. 2 and 3, when the second housing 102 slides on the first housing 101 in the first direction X, a first keypad 111 provided on a lower edge of the first housing 101 is exposed. Further, when the second housing 102 slides on the first housing 101 in the second direction Y, a second keypad 113 provided on one side of the first housing 101 is exposed. Moreover, a lower side of the first keypad 111, and particularly a lower end of the first housing 101, is provided with the sender 115 having a built-in microphone. Hence, when the second housing 102 slides on the first housing 101 in the first direction X, the sender 115 is exposed together with the first keypad 111.

Referring to FIG. 2, the first keypad 111 has keys aligned in a 3×4 array, and digit values are assigned to the keys. Thus, when the first keypad 111 is exposed as the second housing 102 slides on the first housing 101 in the first direction X, a user can input a phone number using the first keypad 111. In order words, when the second housing 102 slides on the first housing 101 in the first direction X, the portable terminal 100 is set to a call mode, and thus the first keypad 111 is set to a digit input mode.

Referring to FIG. 3, the second keypad 113 has keys, to which character values are assigned. The keys are arranged in a QWERTY type key arrangement similar to a personal computer. In addition, the second keypad 113 includes function keys 113a used for menu invocation, search, movement, selection, and similar functions. Thus, when the second keypad 113 is exposed as the second housing 102 slides on the first housing 101 in the second direction Y, a user can use supplementary functions of the portable terminal 100, such as broadcast program viewing, games, e-mail preparation and transmission and the like, using the exposed second keypad 113. Further, when the second housing 102 slides on the first housing 101 in the second direction Y, the display 121 is situated in the longitudinal direction, and thus is suitable to watch broadcast programs and the like. Further, various manipulations are possible by using the second keypad 113 during the broadcast program viewing.

Meanwhile, the first keypad 111 is constructed so that some key overlap with those of the second keypad 113. Specifically, when the second housing 102 slides in any one of the first and second directions X and Y, there are keys at the exposed position. The first and second keypads 111 and 113 have these keys in common with each other. Hereinafter, a keypad formed by the keys shared by the first and second keypads 111 and 113 is referred to as a third keypad 111a. Therefore, note that the first and second keypads 111 and 113 share the third keypad 111a with each other.

Furthermore, a character or digit value is assigned to each of the keys of the third keypad 111a, and an input mode of the third keypad 111a is dependent on the direction in which the second housing 102 slides. More specifically, when the second housing 102 slides in the first direction X, the third keypad 111a is included in the first keypad 111, and thus is set to a digit input mode. In contrast, when the second housing 102 slides in the second direction Y, the third keypad 111a is included in the second keypad 113, and thus is set to the character input mode.

The character or digit value is printed on each of the keys constituting the third keypad 111a, and the illumination for the third keypad 111a is preferably adjusted so as to allow only the character or digit values printed on the keys to be viewed according to the input mode of the third keypad 111a. To this end, the colors used for the illumination for the keypad and colors of the characters or digits printed on the keys are adjusted. Therefore, it is possible to look at only the keys of interest according to the input mode of the third keypad 111a.

Figure 4:
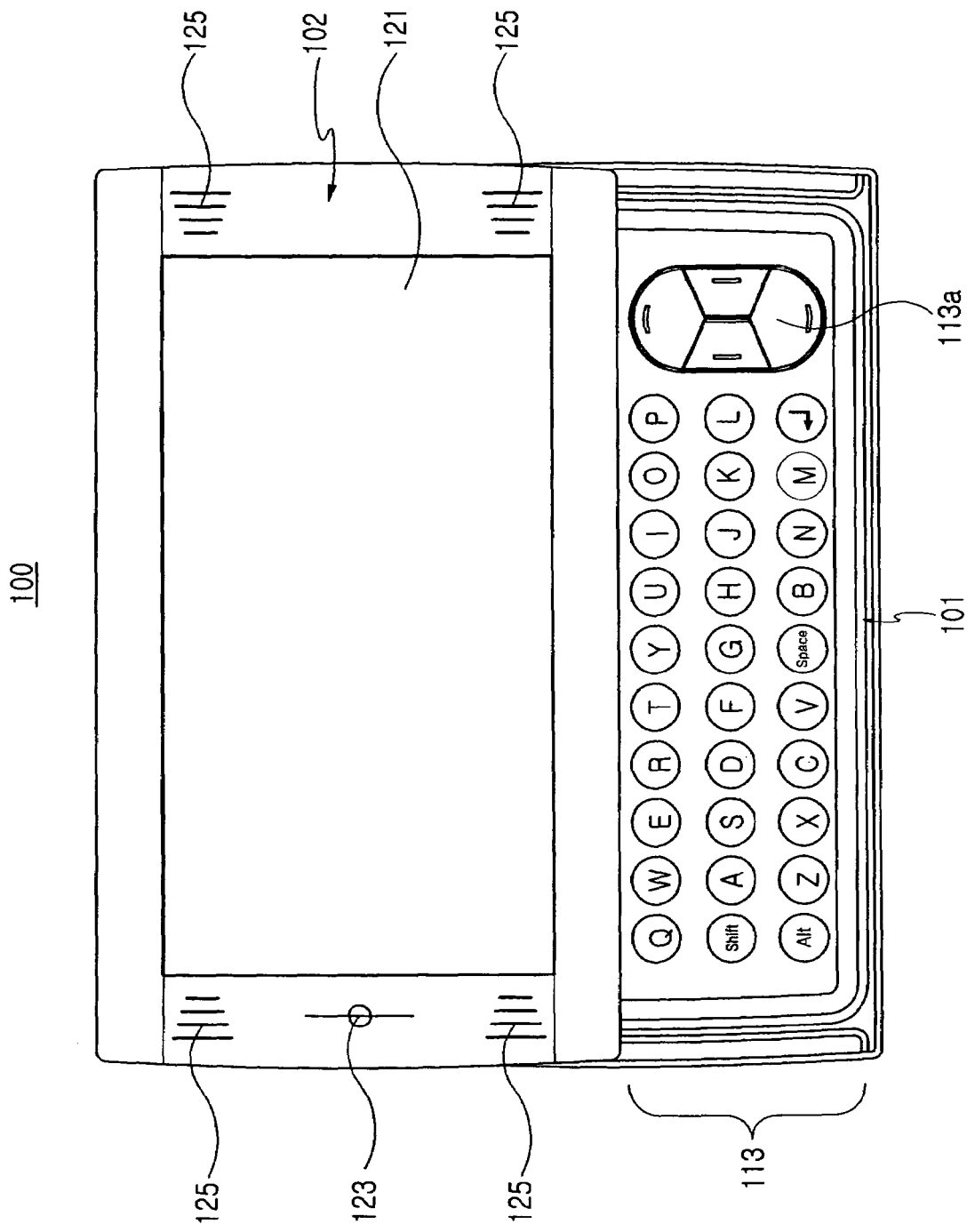
FIG. 4 is a top plan view of a second keypad of a portable terminal according to another exemplary embodiment of the present invention.

FIG. 4 is a top plan view of a second keypad 113 of the keypads of a portable terminal 100 in accordance with another exemplary embodiment of the present invention.

As illustrated, the second keypad 113 of the portable terminal 100 has a construction in which the position of the function keys 113a is different compared to the previous exemplary embodiment. The function keys 113a are located on a region in which the first keypad 111 and the second keypad 113 overlap with each other. Hence, even when the second housing 102 slides in any one of the first and second directions X and Y, the function keys 113a are exposed. For example, when the function keys 113a are exposed as the second housing 102 slides in the first direction X, the user can search and select the stored phone numbers of the other party using the function keys 113a.

As illustrated in FIGS. 5, 6, 8, and 9, in a second exemplary embodiment of the present invention, a sliding module 10 for connecting first and second housings 101 and 102 of the portable terminal is comprised of first and second members 20 and 30, and a dual sliding guide 40. The first member 20 is fastened and fixed to an upper surface of the first housing 101. At this time, clip members 72c of a second stopper 72 are fastened to clip fixtures 72d formed on an upper surface of the first member 20.

Figure 6:
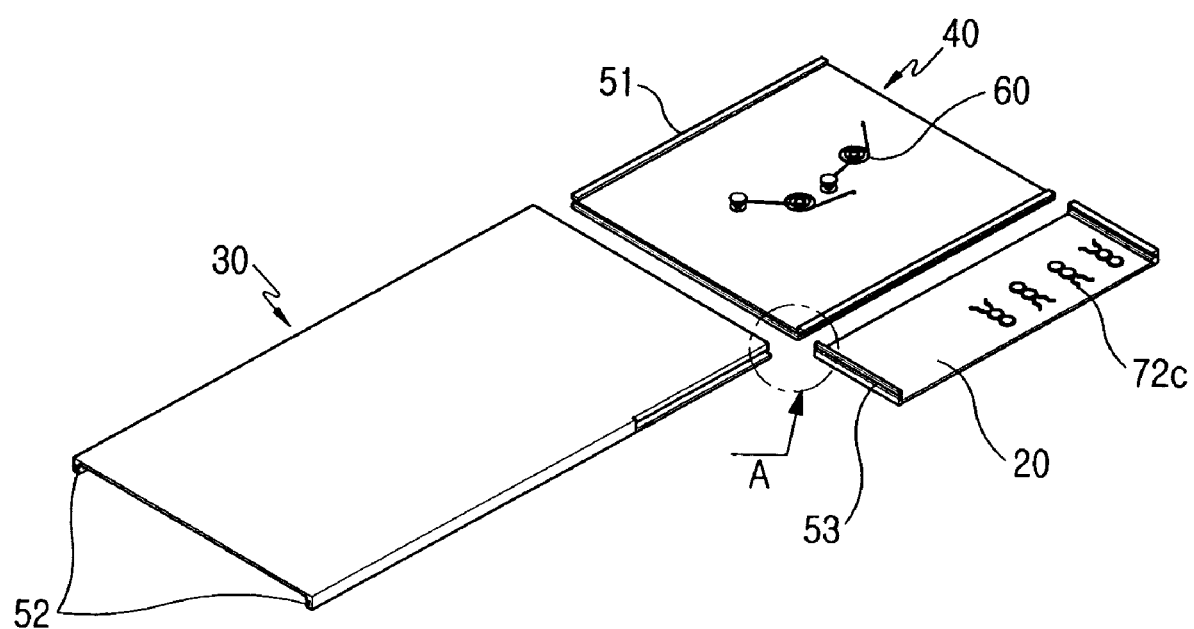
FIG. 6 is an exploded perspective view of a sliding module of a portable terminal in a pre-coupled state according to a second exemplary embodiment of the present invention.
Figure 7:
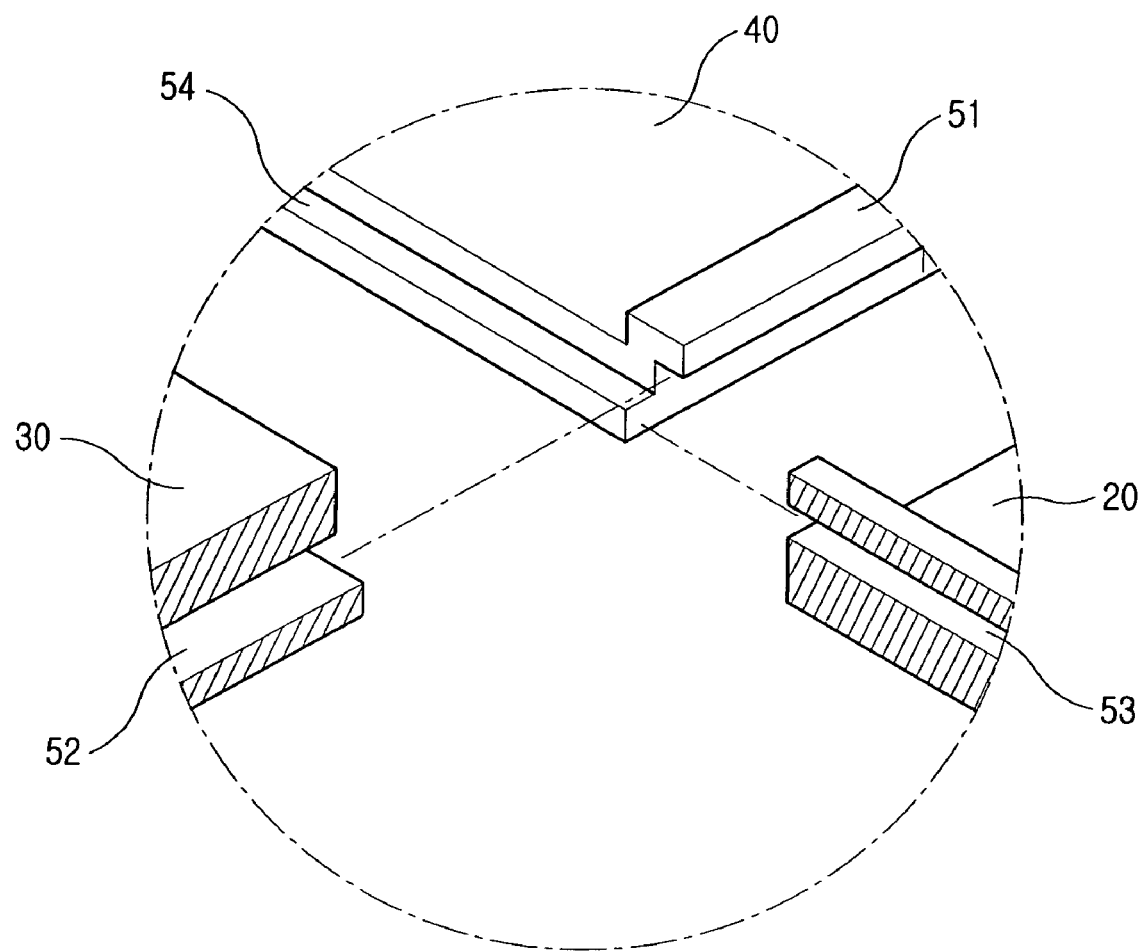
FIG. 7 is a magnified, exploded perspective view of portion A of FIG. 6.

As illustrated in FIGS. 6 and 7, the dual sliding guide 40 is provided with a guiding means 50 for guiding the second housing 102 from the first housing 101 so as to be able to slide in the first or second direction X or Y. The guiding means 50 includes first and second guides 51 and 54. The first member 20 is formed with a pair of guide rails 53 on both ends thereof The pair of second guides 54 of the dual sliding guide 40 is slidably coupled to the pair of guide rails 53. At this time, the dual sliding guide 40 is coupled through the pair of second guides 54 so as to be able to slide in the second direction Y. The pair of first guides 51 of the dual sliding guide 40 is coupled on a pair of guide rails 52 formed on the second member 30 so as to be able to slide in the first direction X.

As illustrated in FIG. 6, at this time, the dual sliding guide 40 is provided with a force supplying means 60 for supplying closing and opening force within and beyond a predetermined distance between the second member 30 and the dual sliding guide 40. The force supplying means 60 includes at least one resilient member, and may include two resilient members 61, 62. A first end of the resilient member is fixed to the second member 30, and a second end is fixedly coupled to the dual sliding guide 40.

Figure 5:
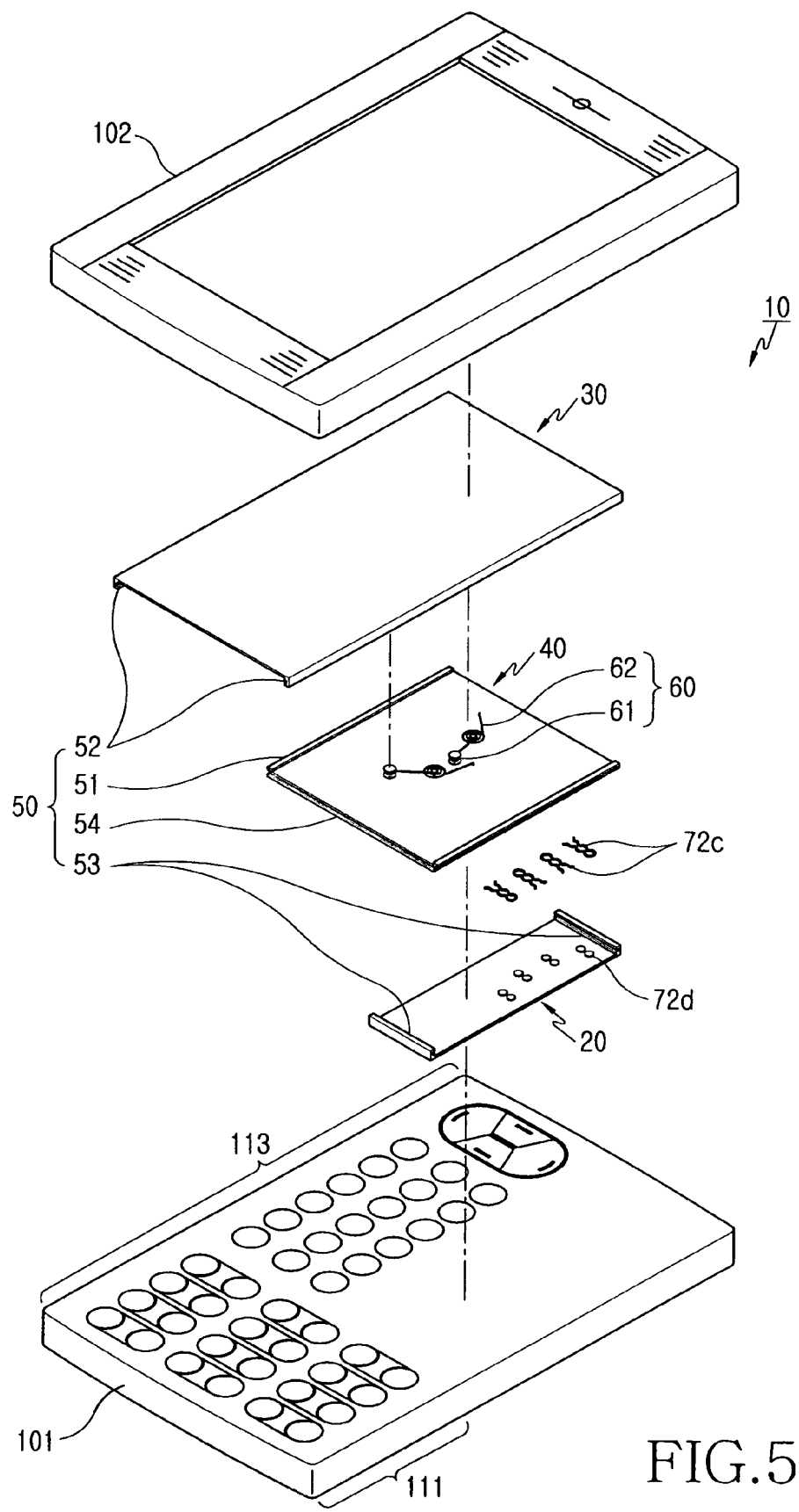
FIG. 5 is an exploded perspective view of a sliding module of a portable terminal according to a second exemplary embodiment of the present invention.

As illustrated in FIG. 5, the second member 30 is fastened to the second housing 102.

Figure 10:
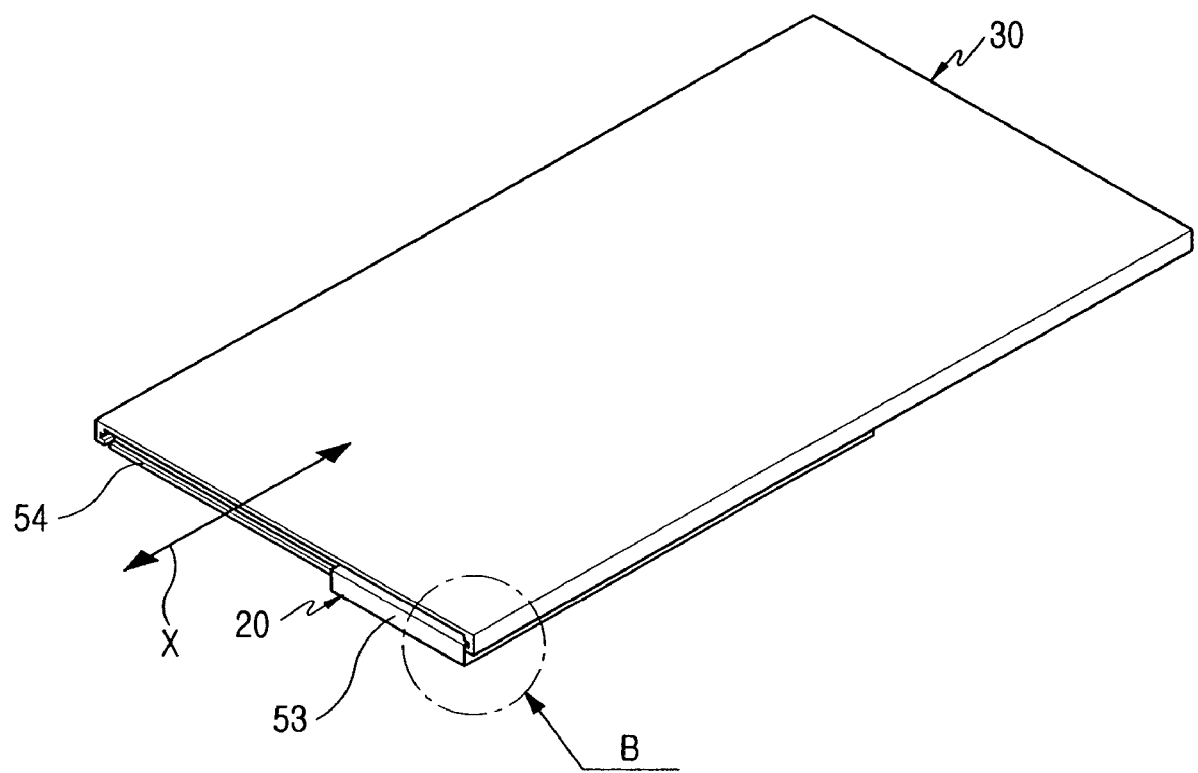
FIG. 10 is a perspective view of a sliding module of a portable terminal which is sliding in a first direction in accordance with a second exemplary embodiment of the present invention.

Here, as illustrated in FIGS. 2 and 10, when a user slides the second housing 102 along the first housing 101 in the first direction X, the second member 30 slides together with the second housing. In this case, the pair of guide rails 52 of the second member 30 slides along the pair of first guides 51 of the dual sliding guide 40.

At this time, as illustrated in FIG. 2, the resilient member 60 slides the second member 30 and exposes the first keypad 111 of the first housing 101.

Figure 8:
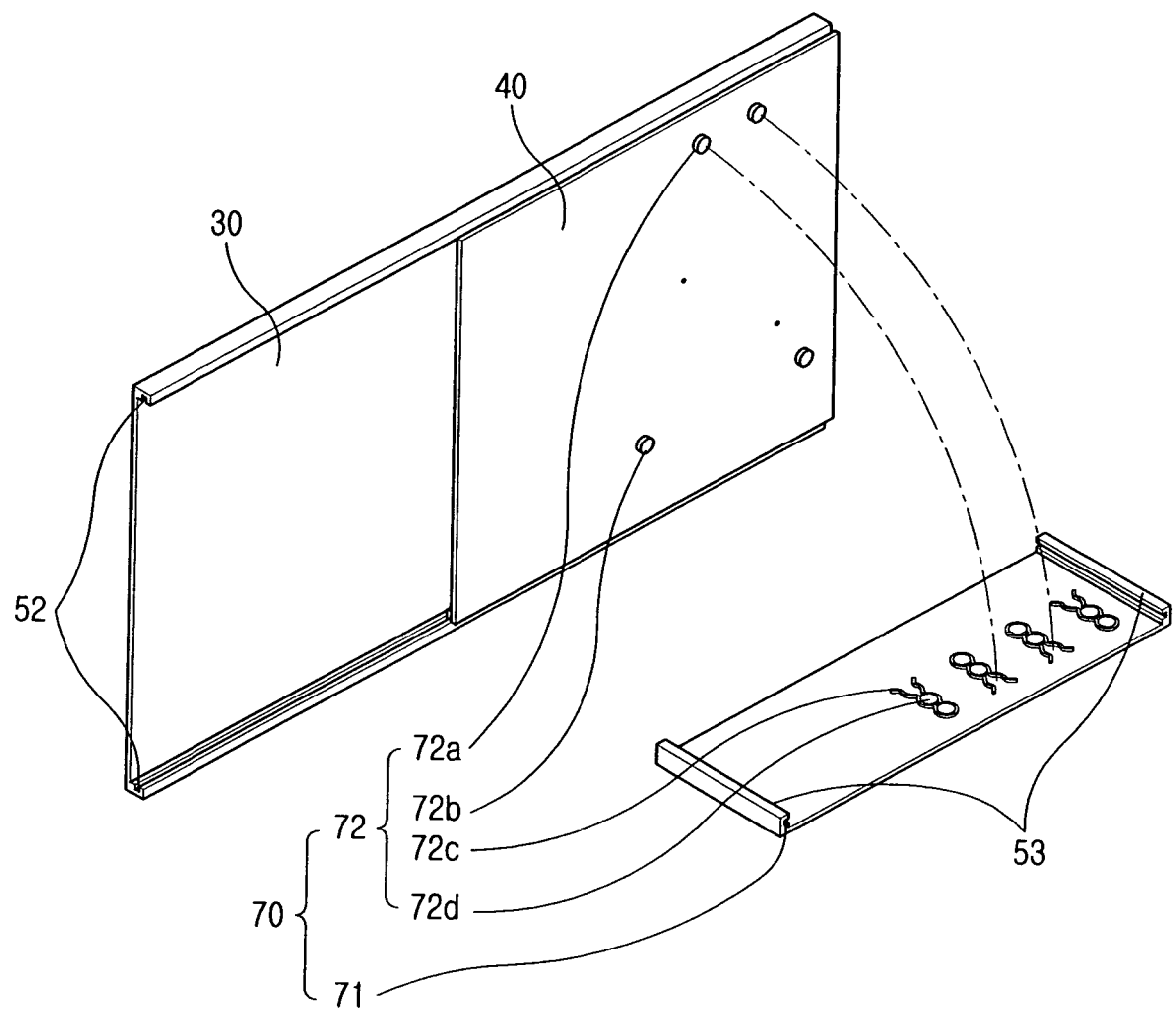
FIG. 8 is an exploded perspective view of a first member and a dual sliding guide of a sliding module of a portable terminal in a pre-coupled state according to a second exemplary embodiment of the present invention.
Figure 9:
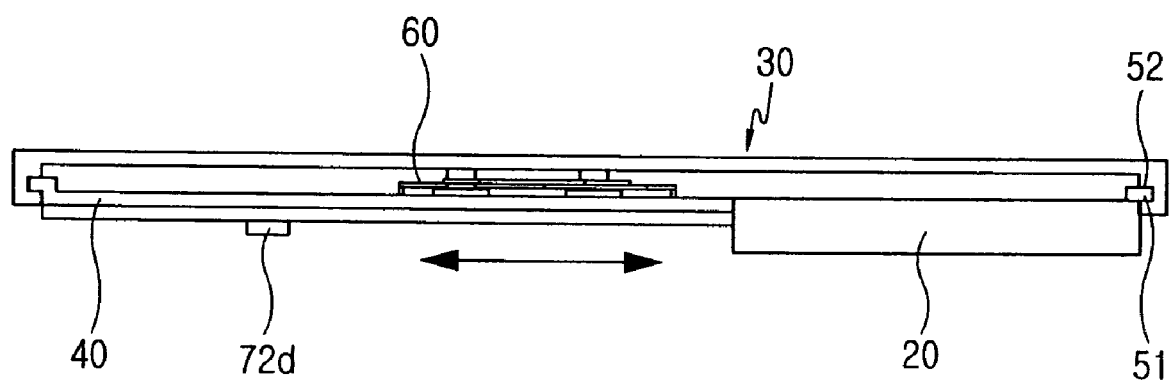
FIG. 9 is a front view of a sliding module of a portable terminal according to a second exemplary embodiment of the present invention.
Figure 11:
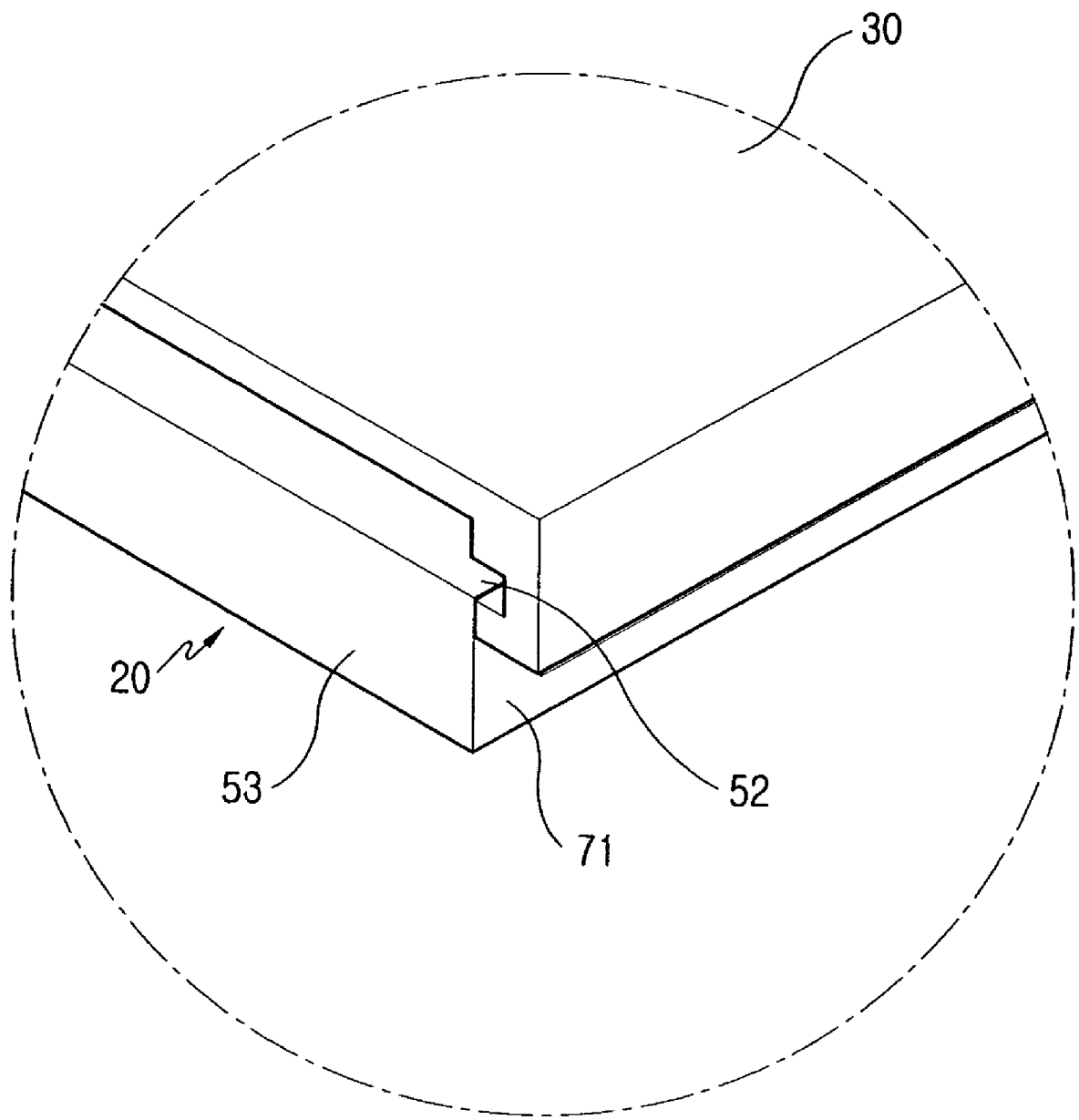
FIG. 11 is a magnified exploded perspective view of portion B of FIG. 10.

Further, as illustrated in FIGS. 8 and 11, the first and second members 20 and 30 are provided with at least one stopping means 70 for restricting movement so as to independently slide in the first or second direction. The stopping means 70 includes first and second stoppers 71 and 72.

As illustrated in FIGS. 8 and 11, the first stopper 71 is formed at one end of the first member 20 so as to impose restrictions on movement of the second direction Y when the second housing 102 slides in the first direction X. When the second member 30 slides, the guide rails 52 of the second member 30 are brought into contact with an end face of one end of the first member 20. Thereby, the second member 30 is allowed to slide only in the first direction X, and is restricted in its movement of the second direction Y.

Figure 12:
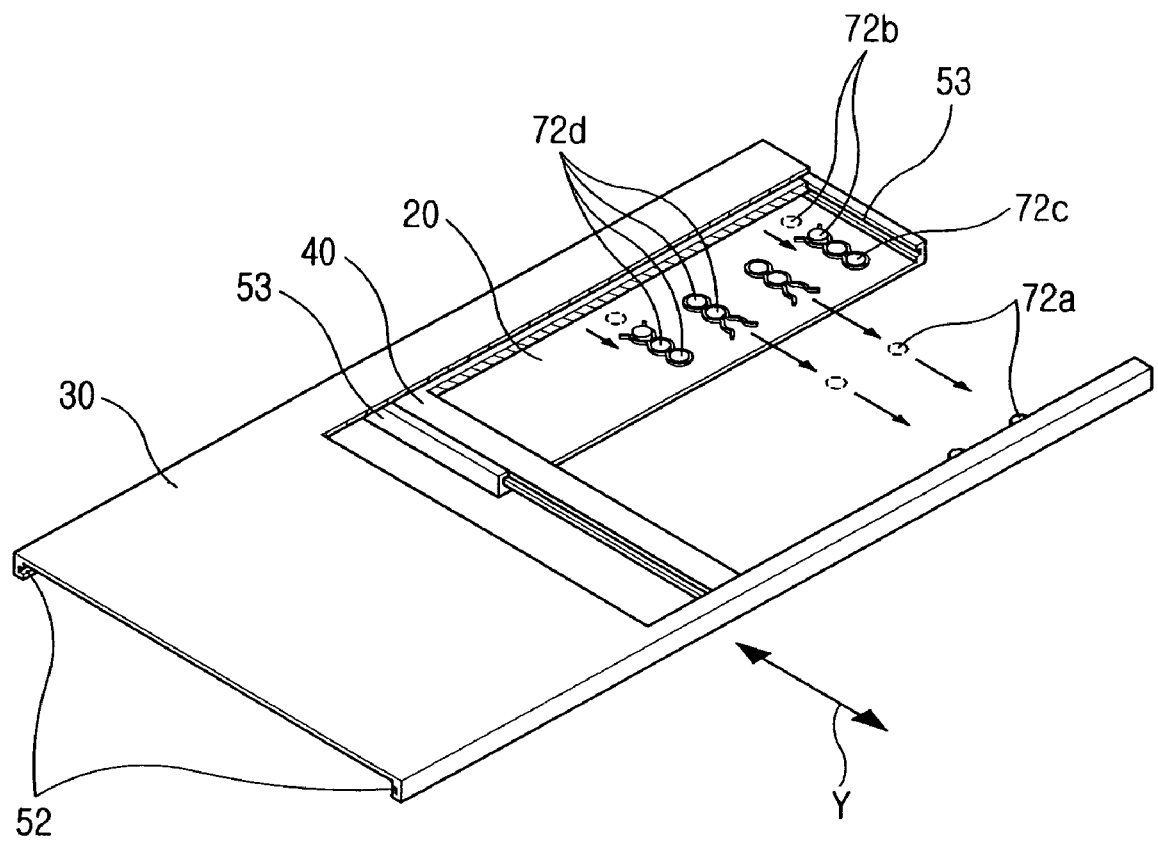
FIG. 12 is a cut-away perspective view of a sliding module of a portable terminal which is sliding in a second direction in accordance with a second exemplary embodiment of the present invention.

Here, as illustrated in FIGS. 3 and 12, when a user slides the second housing 102 along the first housing 101 in the second direction Y, he/she slides the second housing 102 in the direction opposite to the second direction, and then the second housing 102 in the second direction Y.

At this time, as illustrated in FIG. 3, the second keypad 113 of the first housing 101 is exposed.

As illustrated in FIG. 12, when the second housing 102 moves in the second direction Y, the second member 30 and the dual sliding guide 40 move together, and the pair of second guides 54 of the dual sliding guide 40 are guided and displaced by the pair of guide rails 53 formed on both ends of the first member 20.

Figure 13:
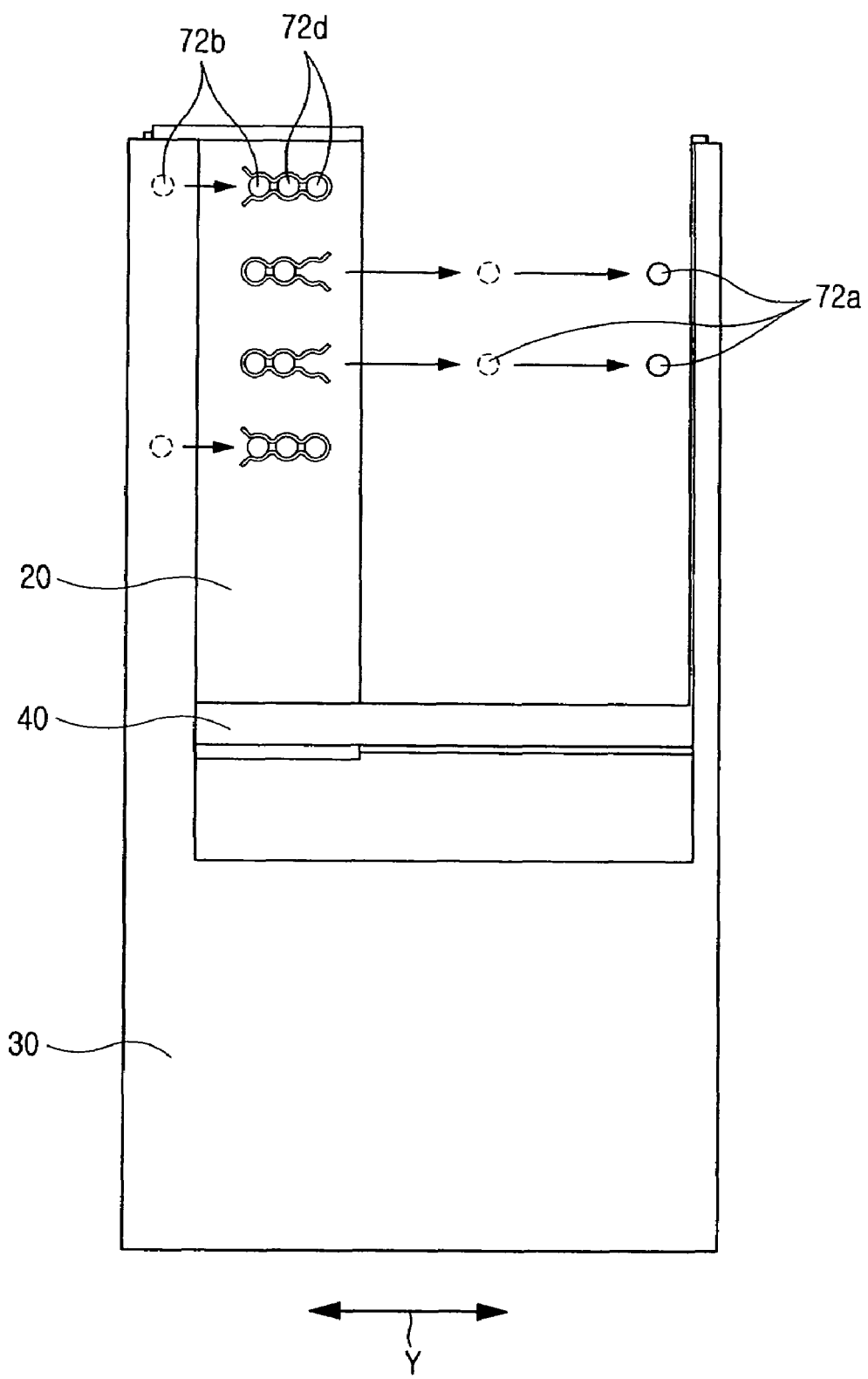
FIG. 13 is a cut-away plan view of a sliding module of a portable terminal which is sliding in a second direction in accordance with a second exemplary embodiment of the present invention.
Figure 14:
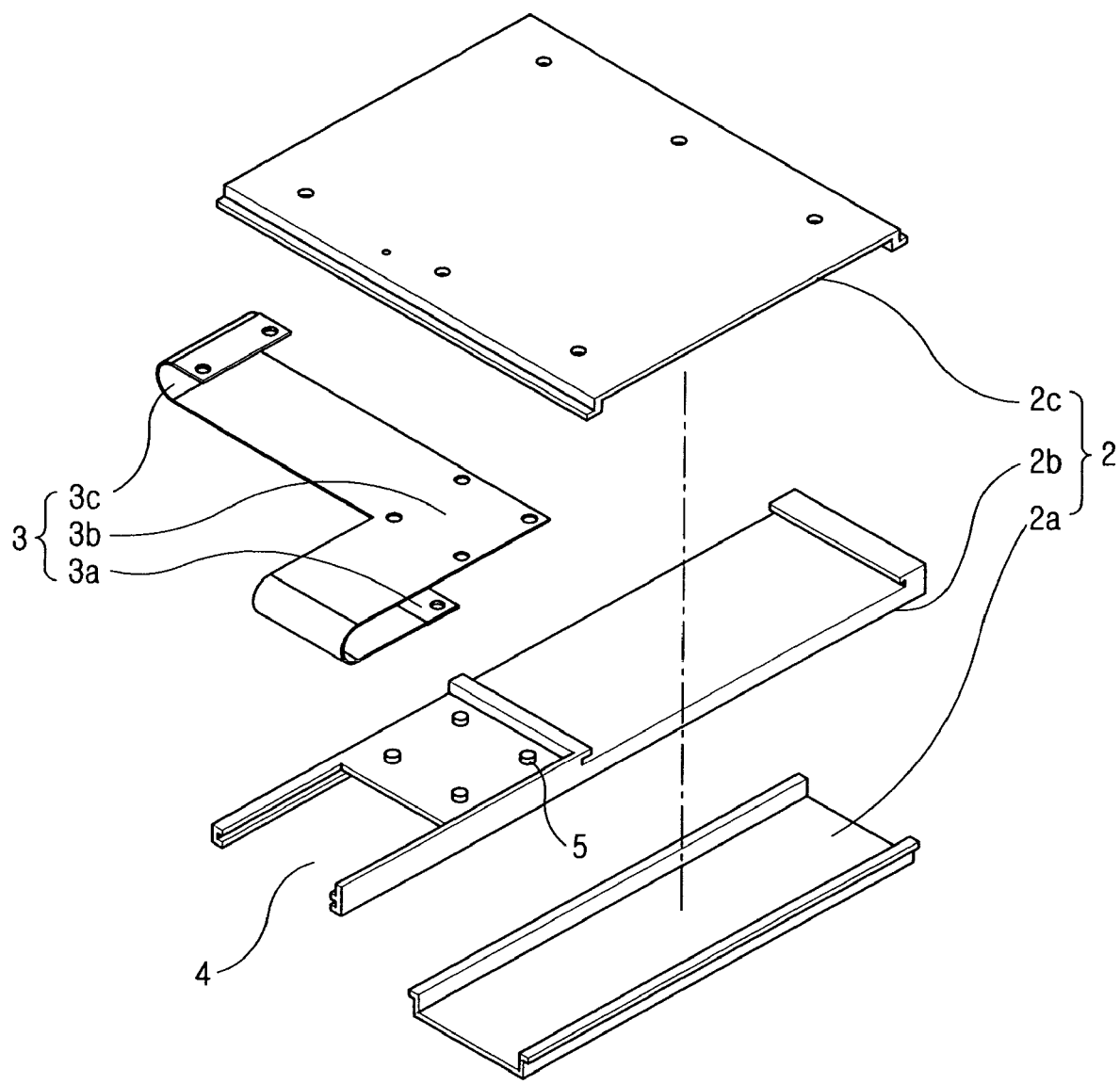
FIG. 14 is an exploded perspective view of a sliding module of a portable terminal according to a third exemplary embodiment of the present invention.
Figure 15:
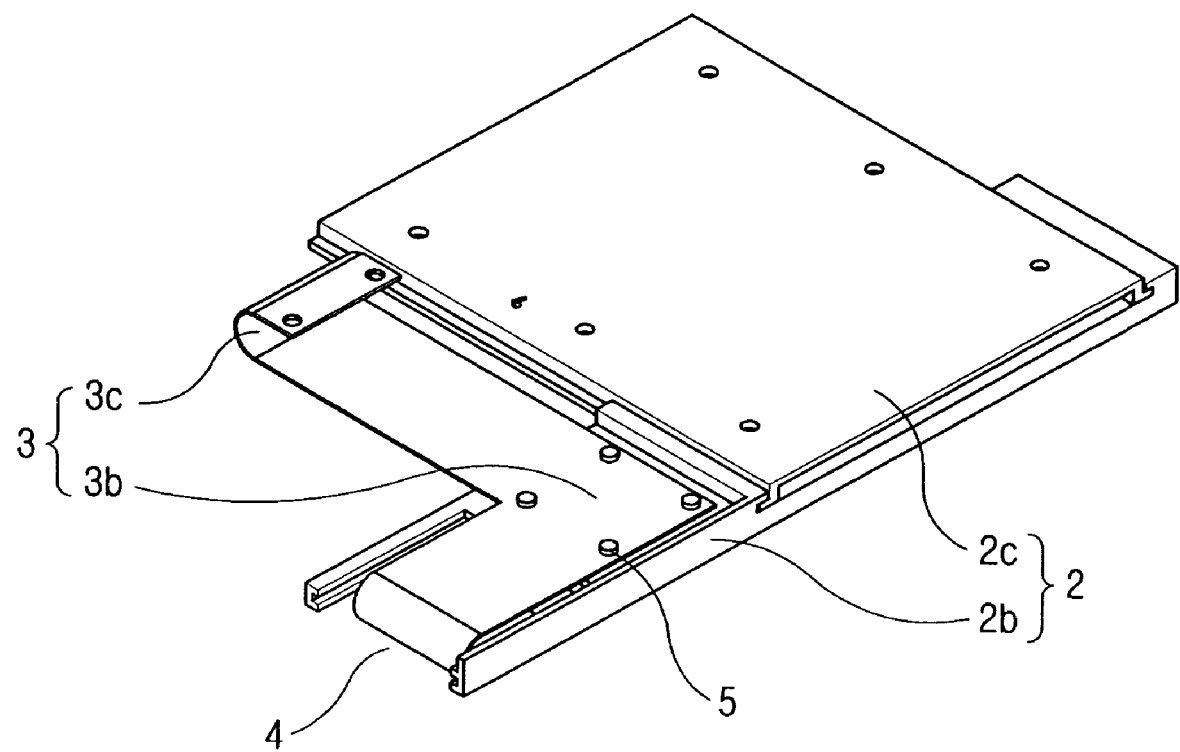
FIG. 15 is an exploded perspective view of a sliding module of a portable terminal in a coupled state according to a third exemplary embodiment of the present invention.

At this time, as illustrated in FIG. 13, first and second coupling members 72a and 72b of the second stopper 72 formed on the dual sliding guide 40 move together. The first coupling member 72a is formed at a start position of the sliding movement of the second housing 102, and the second coupling member 72b is formed at an end position of the sliding movement of the second housing 102.

As illustrated in FIGS. 12 and 13, the first coupling member 72a of the second stopper 72 slides to escape from a first clip member 72c formed on the first member 20. Further, the second housing 102 slides in the second direction Y, and then the second coupling member 72b formed at an end position of the sliding movement of the dual sliding guide 40 is coupled to a second clip member 72c formed at a position adjacent to the first clip member 72c.

Here, when the second housing 102 slides again to return to its original position, the dual sliding guide 40 moves as the second housing 102 slides. The first and second coupling members 72a and 72b move together with the dual sliding guide 40. At this time, the second coupling member 72b located at the end position escapes from the second clip member 72c, and the first coupling member 72a formed at the start position of the sliding movement is coupled to the first clip member 72c again, and thereby the second housing 102 returns to its original position.

As illustrated in FIGS. 14-17, in a third exemplary embodiment of the invention, a sliding module 2 for connecting first and second housings 101 and 102 of the portable terminal is comprised of a base member 2a, first and second sliding members 2b and 2c, and a sliding flexible circuit 3. The base member 2a is fastened to the first housing 101. The first sliding member 2b is fastened on an upper portion of the base member 2a in a stacked form so as to slide in the first direction X, and the second sliding member 2c is fastened on an upper portion of the first sliding member 2b in a stacked form so as to slide in the second direction Y. A middle part 3b of the sliding flexible circuit 3 is fastened to a fixture 5 formed on the first sliding member 2b.

One end 3a of the sliding flexible circuit 3 is electrically connected with a printed circuit board (not shown) provided in the first housing 101. At this time, because the first sliding member 2b is formed with a flexible circuit opening 4 for accommodating the sliding flexible circuit 3, the sliding flexible circuit 3 is accommodated in the flexible circuit opening 4 and electrically connected to the printed circuit board. The other end 3c of the sliding flexible circuit 3 is electrically connected with the printed circuit board provided in the second housing 102.

Figure 16:
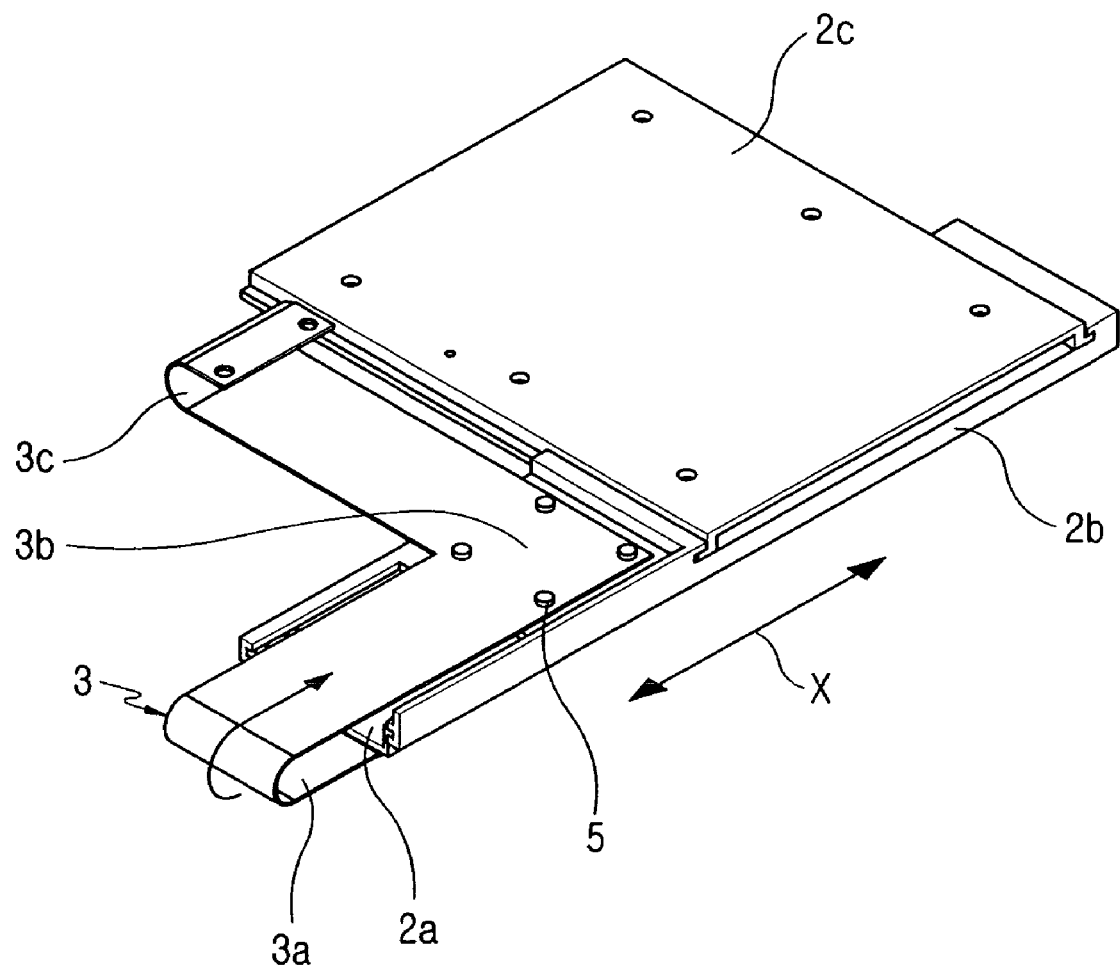
FIG. 16 is a perspective view of a sliding module of a portable terminal which is sliding in a first direction in accordance with a third exemplary embodiment of the present invention.

In this state, as illustrated in FIG. 16, when the second housing 102 slides in the first direction X, the first sliding member 2b moves together, and thus the one end of the sliding flexible circuit 3 is stretched to increase in length in the first direction X. In contrast, when the second housing 102 moves in a direction opposite to the first direction X and returns to its original position, the sliding flexible circuit 3 is bent to decrease in length. At this time, the fixture 5 is fastened to and supports the middle part 3b of the sliding flexible circuit 3, thereby allowing the one end of the sliding flexible circuit 3 to be bent to increase or decrease in length during the sliding movement of the second housing 102.

Figure 17:
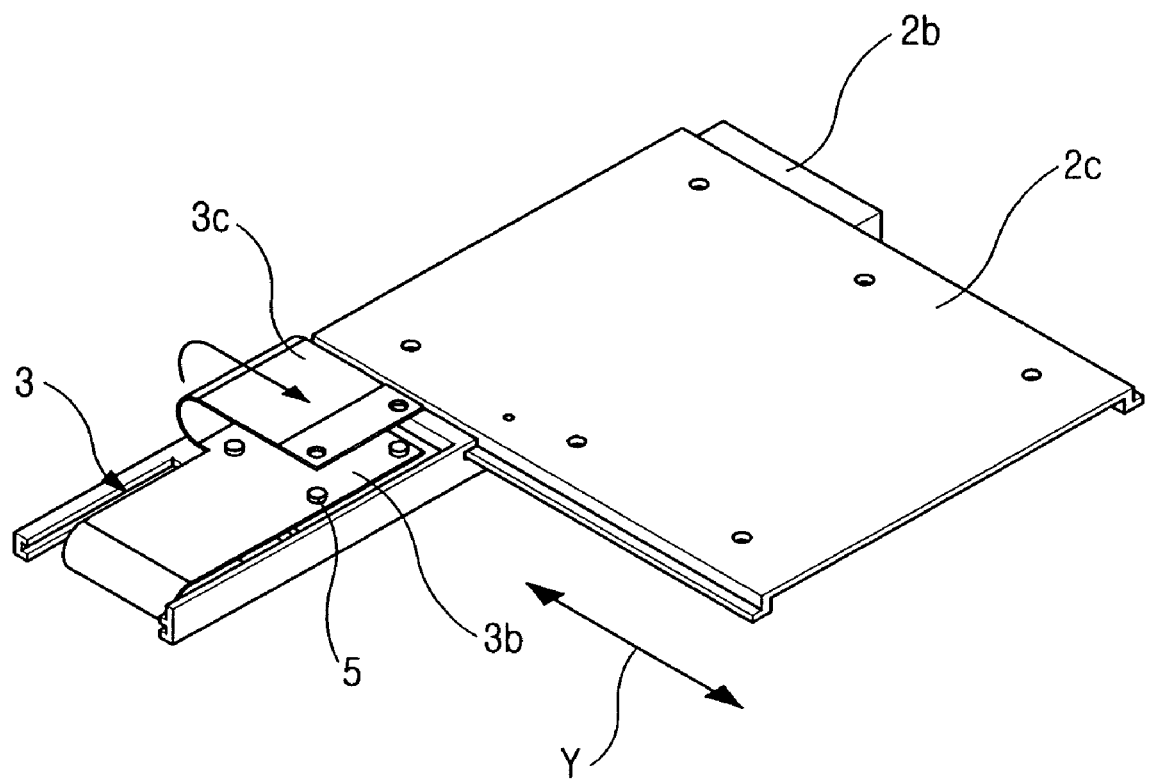
FIG. 17 is a perspective view of a sliding module of a portable terminal which is sliding in a second direction in accordance with a third exemplary embodiment of the present invention.

In this state, as illustrated in FIG. 17, when the second housing 102 slides in the second direction Y, the second sliding member 2c moves together, and thus the other end 3c of the sliding flexible circuit 3 moves to be bent and decreases in length in the second direction Y. At this time, the middle part 3b of the sliding flexible circuit 3 is supported by the fixture 5 so as to allow other end 3c of the sliding flexible circuit 3 to be bent.

Here, when the second housing 102 moves in a direction opposite to the second direction Y and returns to its original position, the sliding flexible circuit 3 is bent to increase in length, and thus stretched.

The sliding flexible circuit 3 has an "L" shape.

In this manner, when the second housing 102 of the portable terminal slides on the first housing 101 in the first or second direction X or Y, the sliding flexible circuit 3 dependently moves in the first or second direction. Thereby, it is possible to prevent the sliding flexible circuit 3 of the portable terminal from being damaged.

Figure 18:
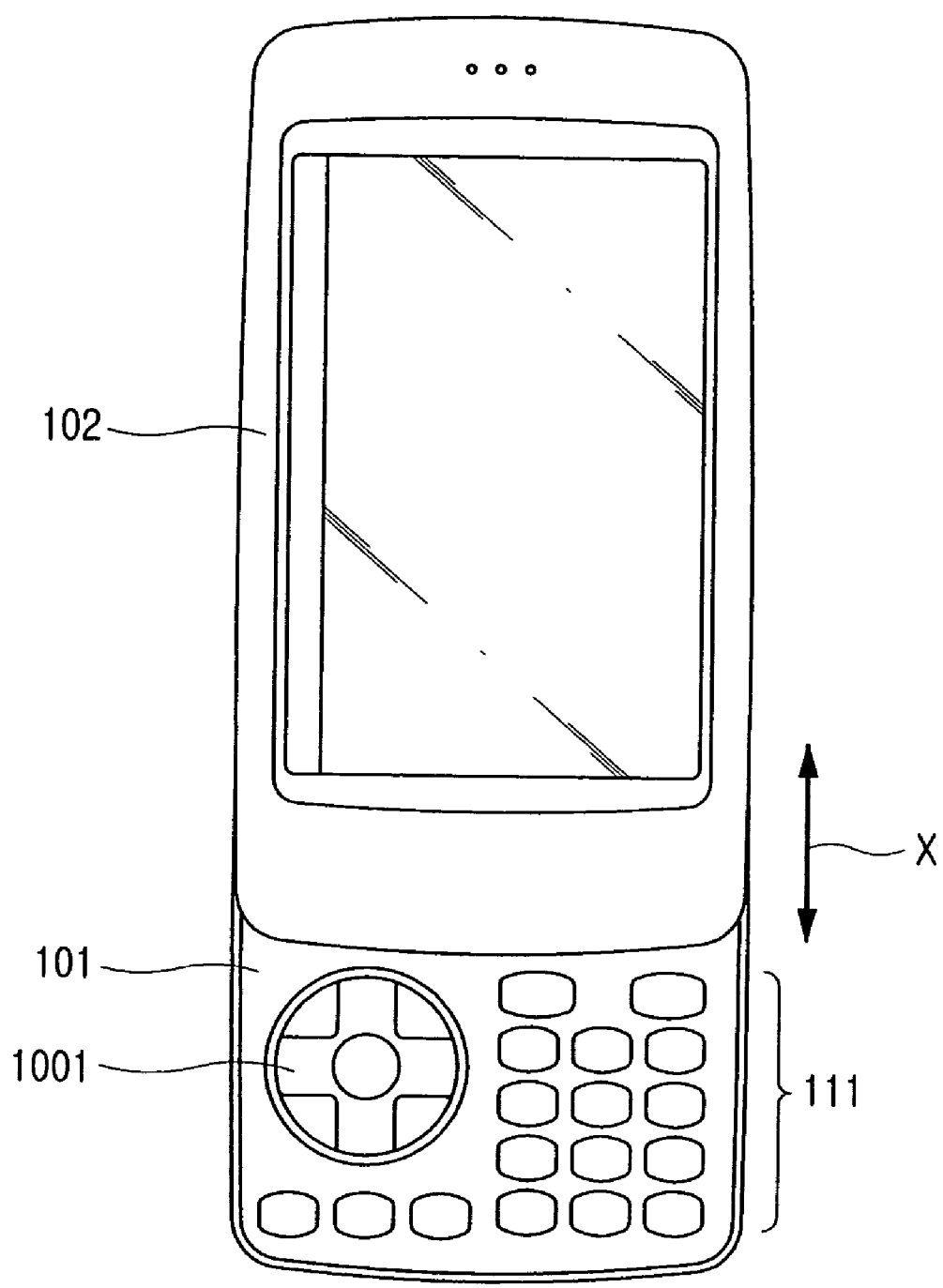
FIG. 18 is a plan view of a first navigation key of a key pad for a portable terminal which is exposed as a second housing slides in a first direction in accordance with a fourth exemplary embodiment of the present invention.
Figure 19:
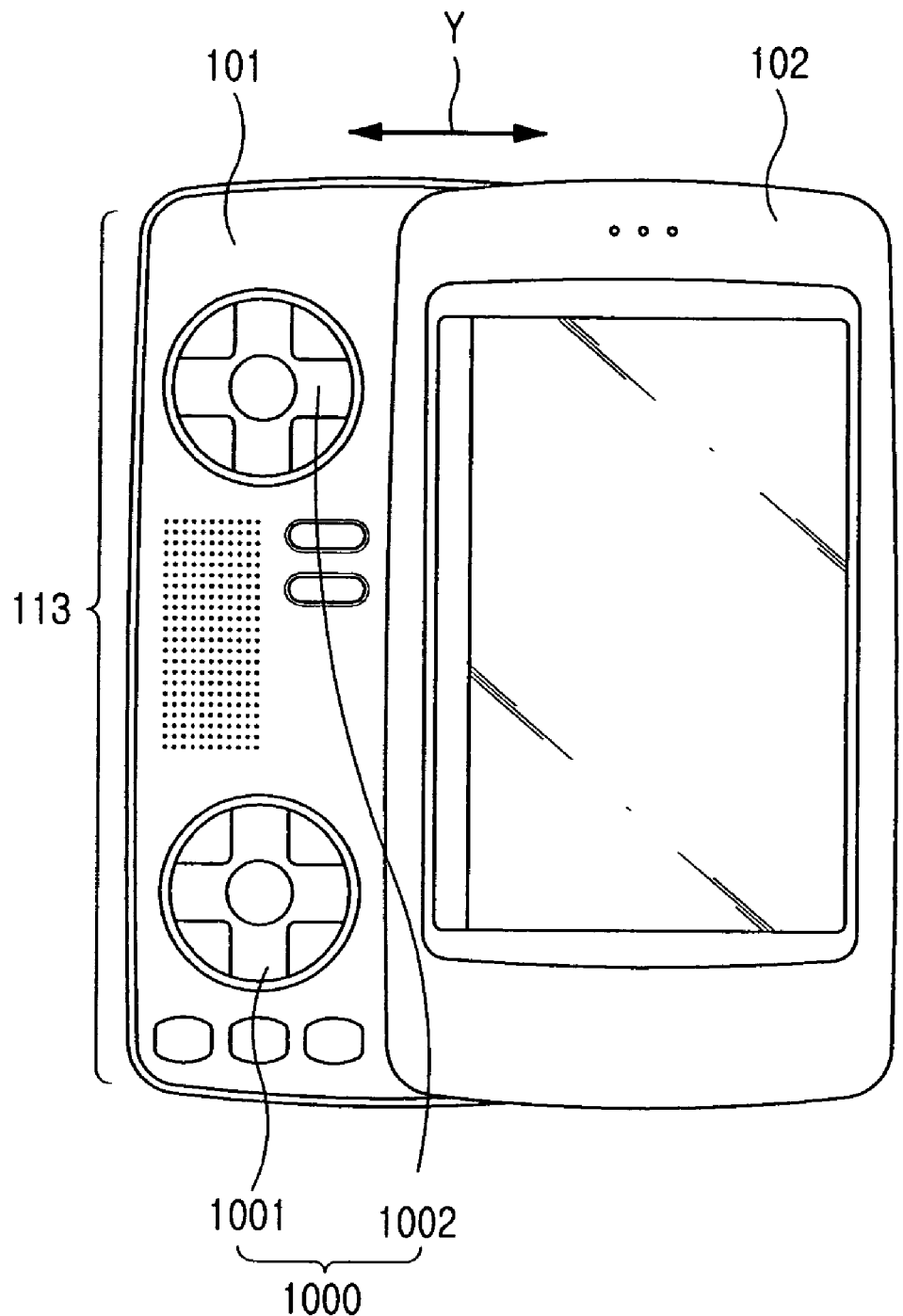
FIG. 19 is a plan view of first and second navigation keys of a key pad for a portable terminal which are exposed as a second housing slides in a second direction in accordance with a fourth exemplary embodiment of the present invention.

As illustrated in FIGS. 18 and 19, in a fourth exemplary embodiment of the present invention, the first key pad 111 and the second key pad 113 of the first housing 101 are provided with at least one navigation key 1000.

The navigation key 1000 is composed of first and second navigation keys 1001 and 1002.

The first navigation key 1001 is provided at a position where the first key pad 111 and the second key pad 113 of the first housing 101 overlap with each other, and the second navigation key 1002 is provided on the second key pad 113 so as to be exposed together with the first navigation key 1001.

In this state, as illustrated in FIG. 18, when the second housing 102 slides on the first housing 101 in a first direction X, the first key pad 111 is exposed and simultaneously the first navigation key 1001 is exposed.

At this time, the user can use the first key pad 111 and the first navigation key 1001 as a key input device and a game key for the portable terminal.

As illustrated in FIG. 19, when intending to use both of the first and second navigation keys 1001 and 1002, the user slides the second housing 102 on the first housing 101 in a second direction Y. Then, the first navigation key 101 provided at the position where the first and second key pads 111 and 113 overlap with each other is exposed and simultaneously the second navigation key 102 is exposed.

In this state, the user can use the first and second navigation keys 1001 and 1002 not only as keys for a game mode but also as keys for other various modes.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A sliding module for a portable terminal, in which the portable terminal includes a first housing provided with first and second keypads, and a second housing coupled with the first housing so as to be able to slide along a first axis and along a second axis substantially perpendicular to the first axis, the sliding module comprising:
    a first member fastened to the first housing;
    a second member fastened to the second housing; and
    a dual sliding guide provided between the first and second members and guiding the second housing so as to be able to slide along the first and second axes;
    wherein the first and second keypads are disposed on a single surface of the first housing.

2. The sliding module according to claim 1, wherein the dual sliding guide has a guiding means for guiding the second housing along the first housing so as to be able to slide along the first and second axes.

3. The sliding module according to claim 2, wherein the guiding means includes:
a pair of first guides on opposing ends of the dual sliding guide substantially parallel to the first axis, and coupled on a pair of guide rails on opposing ends of the second member so as to be able to slide along the first axis; and
a pair of second guides on opposing ends of the dual sliding guide substantially parallel to the second axis, and coupled on a pair of guide rails on both ends of the first member so as to be able to slide along the second axis.

4. The sliding module according to claim 1, further comprising a force supplying means for supplying closing and opening force within and beyond a predetermined distance between the second member and the dual sliding guide.

5. The sliding module according to claim 4, wherein the force supplying means includes at least one resilient member, and
the resilient member is fixed to the second member on one end thereof, fixedly coupled to the dual sliding guide on the other end thereof, and moves along a substantially constant locus as the second housing slides.

6. The sliding module according to claim 1, wherein the first and second members include at least one stopping means for restricting movement so as to independently slide along the first and second axes.

7. The sliding module according to claim 6, wherein the stopping means includes:
a first stopper at one end of the first member for bringing the guide rails of the second member into contact with one end of the first member so as to impose restrictions on movement along the second axis when the second housing slides along the first axis; and
a second stopper provided between the first member and the dual sliding guide for imposing restrictions on movement along the first axis when the second housing slides along the second axis.

8. The sliding module according to claim 7, wherein the second stopper includes:
first and second coupling members inside the dual sliding guide, and provided at start and end positions of the sliding of the second housing, the first and second coupling members moving together with the dual sliding guide as the second housing slides; and
at least one clip member provided on an upper surface of the first member, the at least one clip member being coupled and decoupled to and from the first and second coupling members at the start and end positions of the sliding of the second housing.

9. A sliding module flexible circuit for a portable terminal, in which the portable terminal includes a first housing with first and second keypads, and a second housing coupled with the first housing so as to be able to slide along a first axis and along a second axis substantially perpendicular to the first axis, the sliding module flexible circuit comprising:
a base member fastened to the first housing;
a sliding module having first and second sliding members that are stacked on the base member and slide the second housing along the first housing along the first and second axes; and
a sliding flexible circuit provided in the portable terminal, the sliding flexible circuit bending as the second housing slides along the first and second axes to increase or decrease in dimension along each axis.

10. The sliding module flexible circuit according to claim 9, wherein the first sliding member has a flexible circuit opening for accommodating the sliding flexible circuit.

11. The sliding module flexible circuit according to claim 9, wherein the first sliding member has a fixture for supporting and fixing the sliding flexible circuit so as to allow the sliding flexible circuit to be bent as the first or second housing slides.

12. The sliding module flexible circuit according to claim 11, wherein
the sliding flexible circuit has a "L" shape, and
a first end of the sliding flexible circuit is electrically connected with a printed circuit board provided in the first housing, a middle part of the sliding flexible circuit is fixed to the fixture of the first sliding member, and a second end of the sliding flexible circuit is electrically connected with a printed circuit board provided in the second housing.

13. A key pad for a portable terminal, in which the portable terminal includes a first housing and a second housing coupled with the first housing so as to be able to slide along a first axis and along a second axis substantially perpendicular to the first axis, the key pad comprising:
a first key pad on the first housing, which is exposed or covered as the second housing slides along the first axis;
a second key pad on the first housing, which is exposed or covered as the second housing slides along the second axis, the first and second keypads being disposed on a single surface of the first housing; and
at least one navigation key provided on a region that overlaps portions of the first and second key pads, the navigation key being exposed or covered as the second housing slides along the first and second axes.

14. The key pad according to claim 13, further comprising a second navigation key provided on the second key pad so that the second navigation key is exposed or covered together with the first navigation key as the second housing slides along the second axis.

15. A portable terminal, comprising:
a first housing;
a second housing coupled with the first housing so as to be able to slide along a first axis and along a second axis substantially perpendicular to the first axis;
a first key pad on the first housing including a first navigation key, the first key pad being exposed or covered as the second housing slides along the first axis;
a second key pad on the first housing also including a first navigation key, the second keypad being exposed or covered as the second housing slides along the second axis, the first and second keypads being disposed on a single surface of the first housing; and
an overlapping region where the first and second key pads partially overlap, the overlapping region including a first navigation key, and the overlapping region being exposed by sliding along both the first and second axes.

16. The portable terminal of claim 15, further comprising a sliding module disposed between the first and second sliding members for sliding the second housing along the first housing along the first and second axes.

17. The portable terminal according to claim 15, further comprising:
a second navigation key provided on the second key pad so that the second navigation key is exposed or covered together with the first navigation key as the second housing slides along the second axis.

18. The portable terminal according to claim 16, wherein the sliding module comprises:
a first member attached to the first housing;
a second member attached to the second housing;

a dual sliding guide provided between the first and second members for guiding the second housing along the first and second axes.

19. The portable terminal according to claim 16, wherein the sliding module comprises:
   a base member fastened to the first housing;
   a first sliding member disposed on the base member for sliding the second housing along the first axis;
   a second sliding member disposed on the first sliding member for sliding the second housing along the second axis.

20. The portable terminal according to claim 18, further comprising at least one one stopping means for restricting movement so as to independently slide along the first and second axes.

21. The portable terminal according to claim 20, wherein the stopping means includes:
   a first stopper at one end of the first member for bringing the guide rails of the second member into contact with one end of the first member so as to impose restrictions on movement along the second axis when the second housing slides along the first axis; and
   a second stopper between the first member and the dual sliding guide for imposing restrictions on movement along the first axis when the second housing slides along the second axis.

22. The portable terminal according to claim 21, wherein the second stopper includes:
   first and second coupling members inside the dual sliding guide, and provided at start and end positions of the sliding of the second housing, the first and second coupling members moving together with the dual sliding guide as the second housing slides; and
   at least one clip member on an upper surface of the first member, the at least one clip member being coupled and decoupled to and from the first and second coupling members at the start and end positions of the sliding of the second housing.

23. The portable terminal according to claim 19, further comprising a sliding flexible circuit provided in the portable terminal, the sliding flexible circuit bending as the second housing slides along the first and second axes to increase or decrease in dimension along each axis.

24. The portable terminal according to claim 23, wherein the first sliding member has a flexible circuit opening for accommodating the sliding flexible circuit.

25. The portable terminal according to claim 23, wherein the first sliding member has a fixture for supporting and fixing the sliding flexible circuit so as to allow the sliding flexible circuit to be bent as the first or second housing slides.

26. The portable terminal according to claim 25, wherein
   a first end of the sliding flexible circuit is electrically connected with a printed circuit board provided in the first housing, a middle part of the sliding flexible circuit is fixed to the fixture of the first sliding member, and a second end of the sliding flexible circuit is electrically connected with a printed circuit board provided in the second housing.

* * * * *